United States Patent
Hammad et al.

(10) Patent No.: US 7,337,704 B2
(45) Date of Patent: Mar. 4, 2008

(54) SINGLE SERVE BEVERAGE MAKER WITH COORDINATED HEATING AND PUMPING PERIODS

(75) Inventors: Jamal Hammad, Parkland, FL (US); Terry Tang, Kowloon (HK)

(73) Assignee: Sunbeam Products, Inc., Boca Raton, FL (US)

( * ) Notice: Subject to any disclaimer, the term of this patent is extended or adjusted under 35 U.S.C. 154(b) by 0 days.

(21) Appl. No.: 11/370,958

(22) Filed: Mar. 7, 2006

(65) Prior Publication Data

US 2006/0266224 A1 Nov. 30, 2006

Related U.S. Application Data

(60) Provisional application No. 60/684,897, filed on May 25, 2005.

(51) Int. Cl.
*A47J 31/00* (2006.01)

(52) U.S. Cl. .............................. 99/281; 99/282; 99/295

(58) Field of Classification Search .......... 99/288–310, 99/280–282, 323, 327–333; 210/473–482
See application file for complete search history.

(56) References Cited

U.S. PATENT DOCUMENTS

| | | | |
|---|---|---|---|
| 3,587,444 A | 6/1971 | Godel et al. | |
| 4,858,522 A * | 8/1989 | Castelli | 99/280 |
| 4,970,948 A * | 11/1990 | Giannelli | 99/280 |
| 5,183,998 A * | 2/1993 | Hoffman et al. | 219/492 |
| 5,207,148 A * | 5/1993 | Anderson et al. | 99/281 |
| 5,309,821 A | 5/1994 | Knepler | |
| 5,404,794 A * | 4/1995 | Patel et al. | 99/280 |
| 5,671,325 A * | 9/1997 | Roberson | 392/442 |
| 6,000,317 A | 12/1999 | Van Der Meer | |
| 6,082,245 A | 7/2000 | Nicolai | |
| 6,082,247 A * | 7/2000 | Beaulicu | 99/302 R |
| 6,098,525 A | 8/2000 | Gijzel | |
| 6,164,189 A | 12/2000 | Anson | |
| 6,612,224 B2 * | 9/2003 | Mercier et al. | 99/282 |
| 6,843,165 B2 | 1/2005 | Stoner | |
| 2004/0226452 A1 | 11/2004 | Lyall, III | |

FOREIGN PATENT DOCUMENTS

| | | |
|---|---|---|
| DE | 102 39 595 | 3/2004 |
| EP | 392254 | 10/1990 |
| WO | WO 2004 112556 | 12/2004 |
| WO | WO 2005 013780 | 2/2005 |

* cited by examiner

*Primary Examiner*—Timothy F. Simone
(74) *Attorney, Agent, or Firm*—Lawrence J. Shurupoff

(57) ABSTRACT

A beverage maker includes a reservoir; a heater for heating water in the reservoir from a starting temperature to a brewing temperature; a temperature sensor for sensing the temperature of the water and the heater; a pump connected to the reservoir for pumping hot water from the reservoir at the brewing temperature to a user's cup via an infusible food material; and a controller adapted to operate the pump over a predetermined pumping time based at least in part on the time interval to bring the water temperature in the reservoir from the starting temperature to the brewing temperature. The controller may also be programmed to turn said heater on, turn said pump on when the water temperatures reaches said brewing temperature, and turn said heater and pump off when said temperature sensor senses another temperature higher than said brewing temperature.

10 Claims, 12 Drawing Sheets

FIG. 6
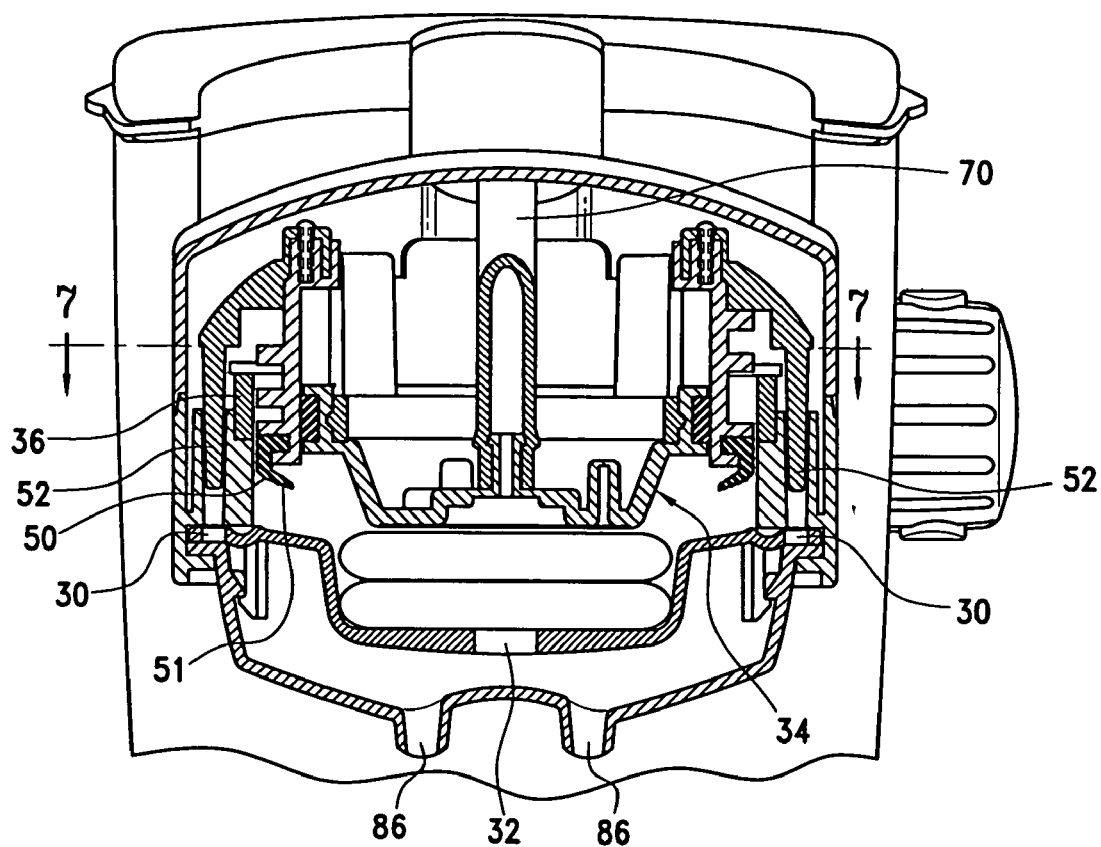
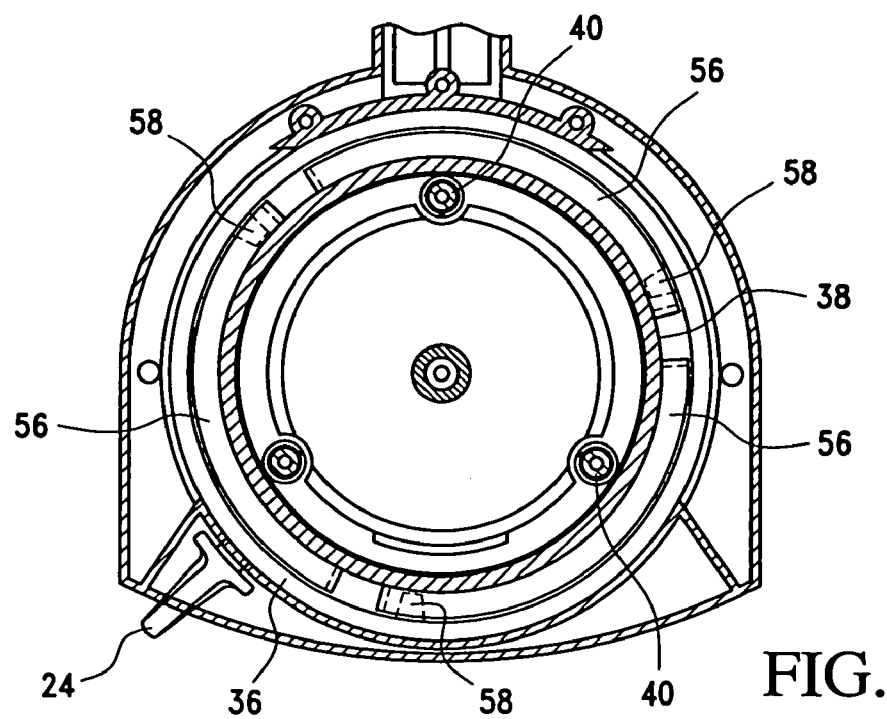
FIG. 7

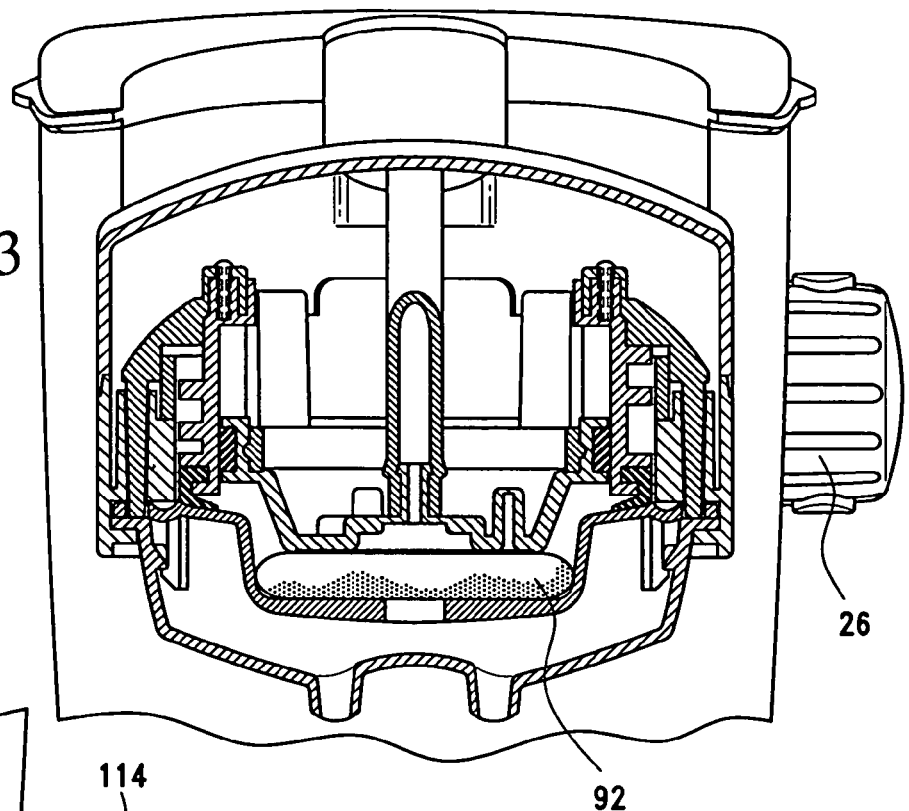
FIG. 13
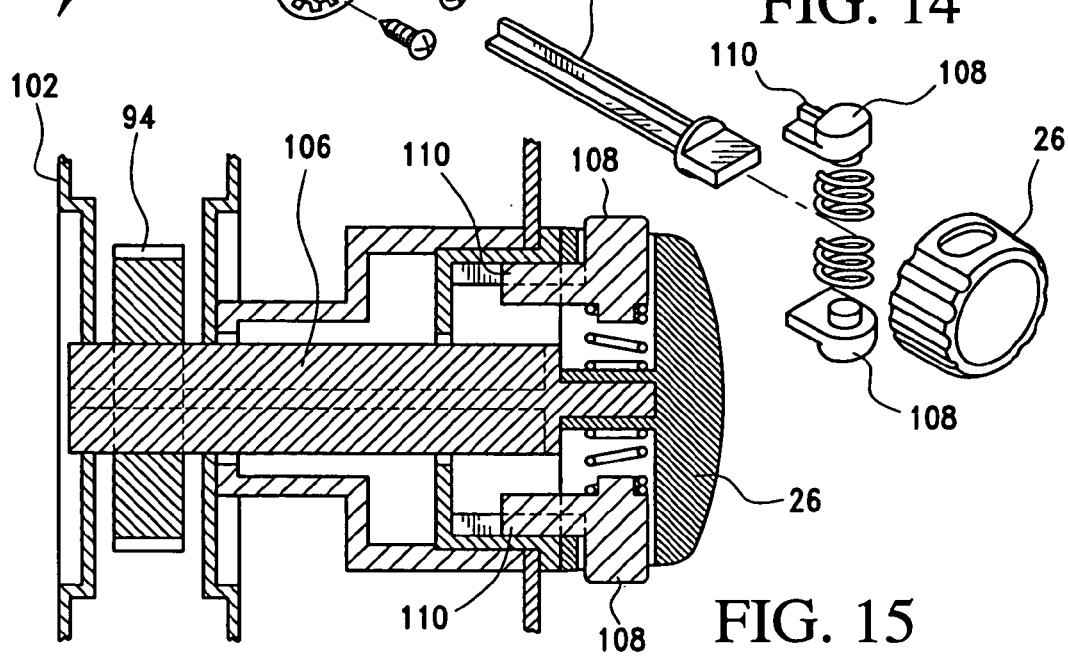
FIG. 14
FIG. 15

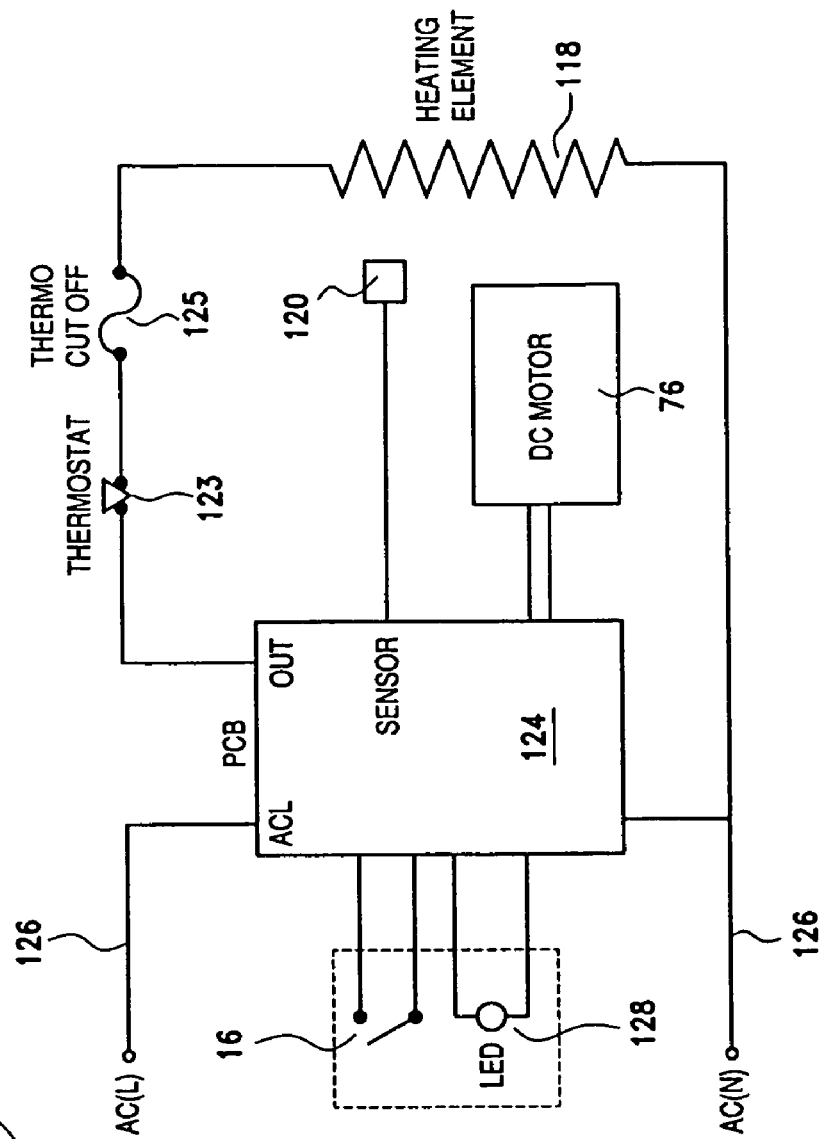
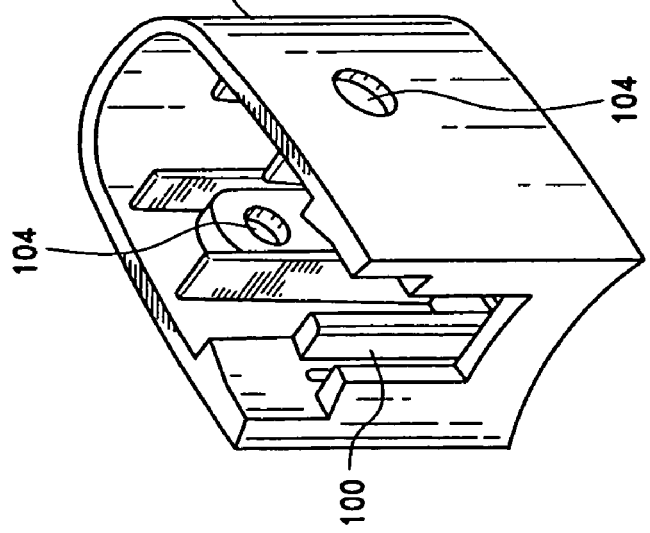

SINGLE SERVE BEVERAGE MAKER WITH COORDINATED HEATING AND PUMPING PERIODS

CROSS REFERENCED TO RELATED APPLICATIONS

This is a nonprovisional application of provisional application Ser. No. 60/684,897, filed on May 25, 2005, which is hereby incorporated by reference and the priority benefit of which is hereby claimed. This application is also related to application Ser. No. 11/136,961, filed on May 25, 2005, which is hereby incorporated by reference.

FIELD OF THE INVENTION

The present invention relates to a beverage maker using pre-packed pods and more particularly to a coffee or tea brewer allowing the user to make a single serving of coffee, tea, or other infusible food material.

BACKGROUND OF THE INVENTION

Beverage brewers such as coffee and tea brewers are commonly used in homes and offices for preparing hot beverages. Some brewers conveniently prepare hot beverages by accepting coffee/tea pre-packed in a pod. A user can dispose of the used coffee/tea pod in one single motion without the customary need for cleaning required with conventional automatic drip coffeemakers or espresso makers or tea makers.

The current single-serve, pod-type brewers available on the market have some limitations in that they impose on the user/customer the need to use two different interchangeable pod holders in order to brew one cup or two cups of coffee. Moreover, many one-cup brewer designs have a reservoir or a holding tank which is not fully emptied during each brewing cycle. This can be inconvenient when the amount of water that is left in the reservoir does not meet the desired amount of hot beverage that the user wants when they start the brewer for the next cup of beverage. Some current designs have preset volumes for brewing each cup. This is accomplished by the use of a flow meter which controls the amount of hot water pumped from the brewer. This is a costly and complex approach to metered brewing.

OBJECTS AND SUMMARY OF THE INVENTION

The present invention provides a beverage brewer which is highly useful in the preparation of small servings of beverages brewed from pods.

In summary, the present invention provides a beverage maker, comprising a reservoir; a heater for heating water in the reservoir from a starting temperature to a brewing temperature; a temperature sensor for sensing the temperature of the water and the heater; a pump connected to the reservoir for pumping hot water from the reservoir at the brewing temperature to a user's cup via an infusible food material; and a controller adapted to operate the pump over a predetermined pumping time based at least in part on the time interval to bring the water temperature in the reservoir from the starting temperature to the brewing temperature. The controller may also be programmed to turn said heater on, turn said pump on when the water temperatures reaches said brewing temperature, and turn said heater and pump off when said temperature sensor senses another temperature higher than said brewing temperature.

These and other objects of the present invention will become apparent from the following detailed description.

BRIEF DESCRIPTIONS OF THE DRAWINGS

FIG. 6 is a cross-sectional view taken along line 6-6 of FIG. 5.

FIG. 7 is a cross-sectional view taken along line 7-7 of FIG. 6.

FIG. 12 is a perspective view of a gear housing made in accordance with the present invention.

FIG. 13 is a view similar to FIG. 9, showing a single pod and a reduced brewing chamber.

FIG. 14 is an assembly drawing of a locking arrangement for locking the vertical adjustment of the brew head.

FIG. 15 is a cross-sectional view through the locking arrangement of FIG. 14.

FIG. 16 is an electrical schematic diagram for the electrical components of the present invention.

DETAILED DESCRIPTION OF THE INVENTION

Figure 1:
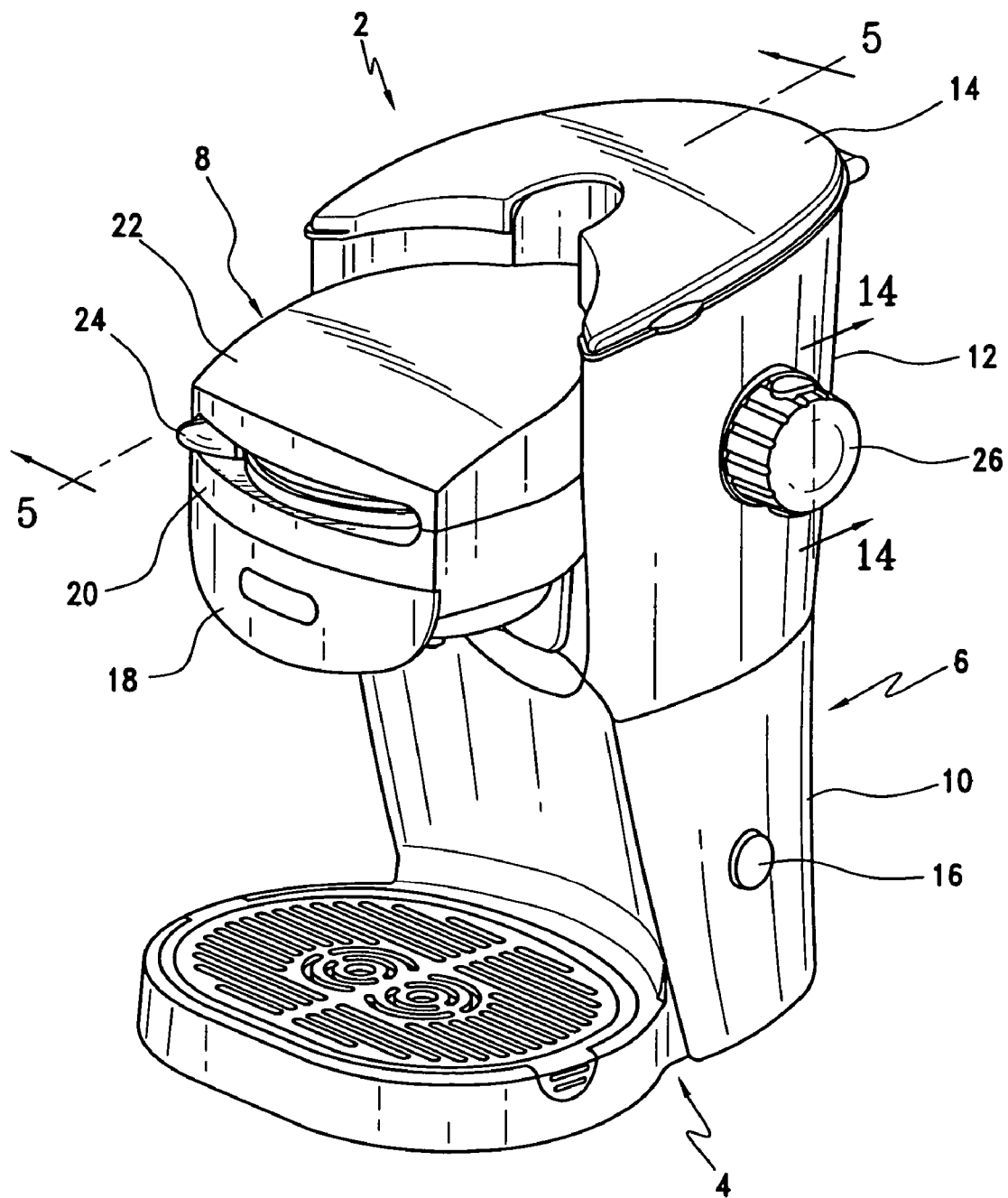
FIG. 1 is a top perspective view of a beverage maker made in accordance with the present invention, showing a brew head vertically supported on a stand.

A beverage maker 2 made in accordance with the present invention is disclosed in FIG. 1. The beverage maker 2 may be used for brewing coffee, tea, or any other hot beverage. The beverage maker 2 includes a base 4 and a stand 6. A brew head 8 is vertically adjustable with respect to the stand 6. The stand 6 comprises a lower housing 10 and a reservoir 12. A hinged cover 14 allows for the filling of the reservoir 12. An on/off push button 16 controls the power to the beverage maker 2.

The brew head 8 includes a pod drawer 18, a lower housing 20 and an upper housing 22. A tab 24 connected to a locking ring (see FIG. 3) locks the drawer 18 in place when turned to the right. A knob 26 is operably associated with the brew head 8 such that turning the knob clockwise or counterclockwise raises or lowers the brew head 8, respectively.

Figure 2:
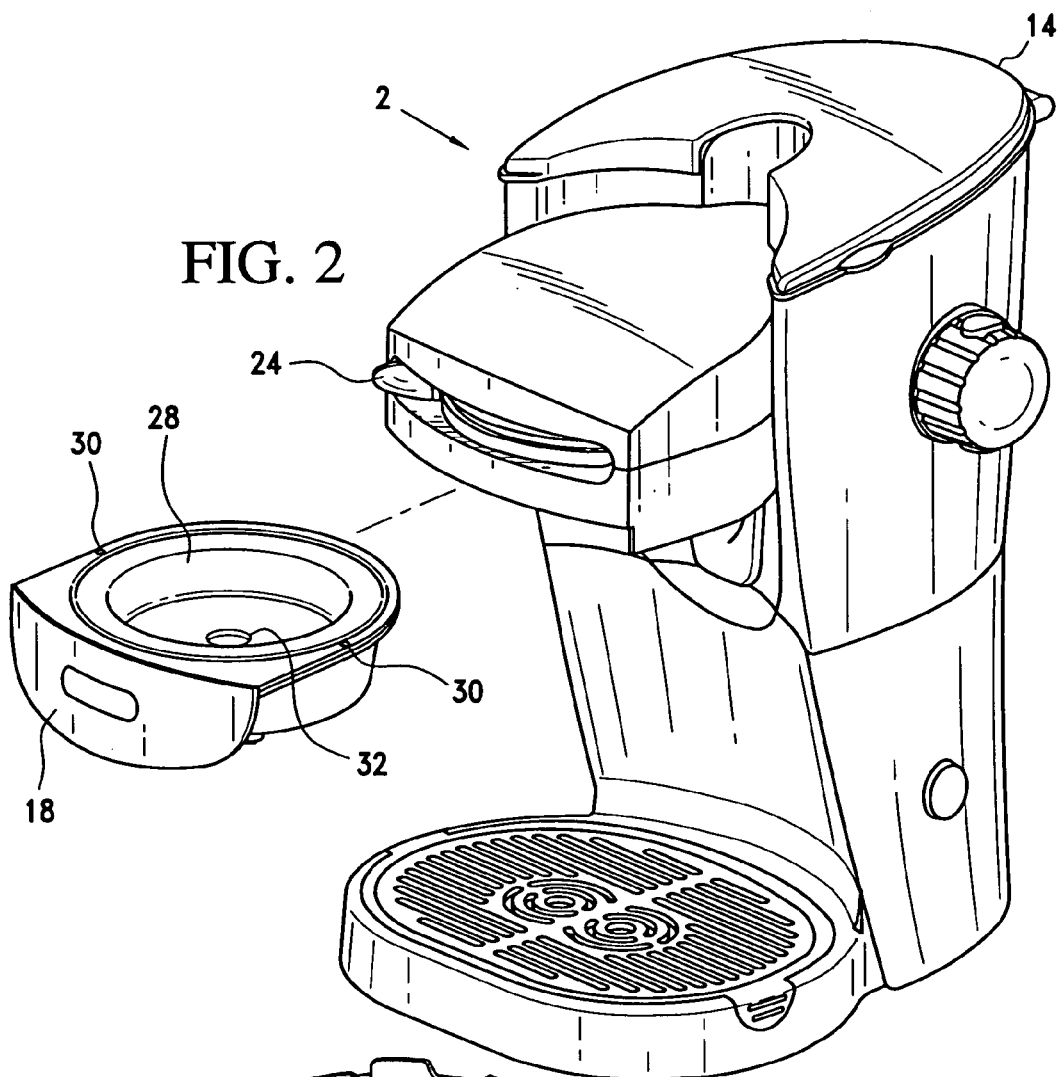
FIG. 2 is a perspective view of the beverage maker of FIG. 1, showing a drawer and pod holder removed from the brew head of FIG. 1.

Referring to FIG. 2, the drawer 18 carries a pod holder 28. The holder 28 has holes 30 that receive the end portions of vertical pins (see FIGS. 6 and 9) when the tab 24 is turned to the right. The pod holder 28 also has a bottom hole 32 to allow the beverage to flow down into a cup.

Figure 3:
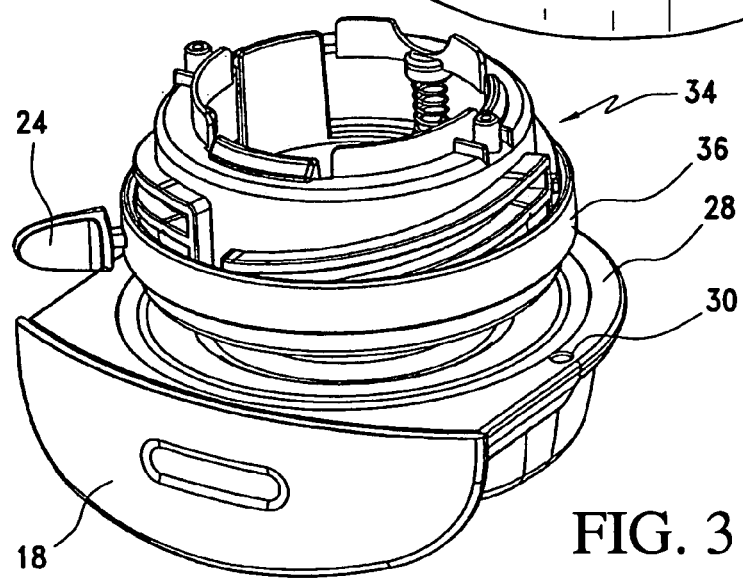
FIG. 3 is perspective view of a showerhead assembly and the pod holder that comprise some of the components of the brew head of FIG. 1.
Figure 4:
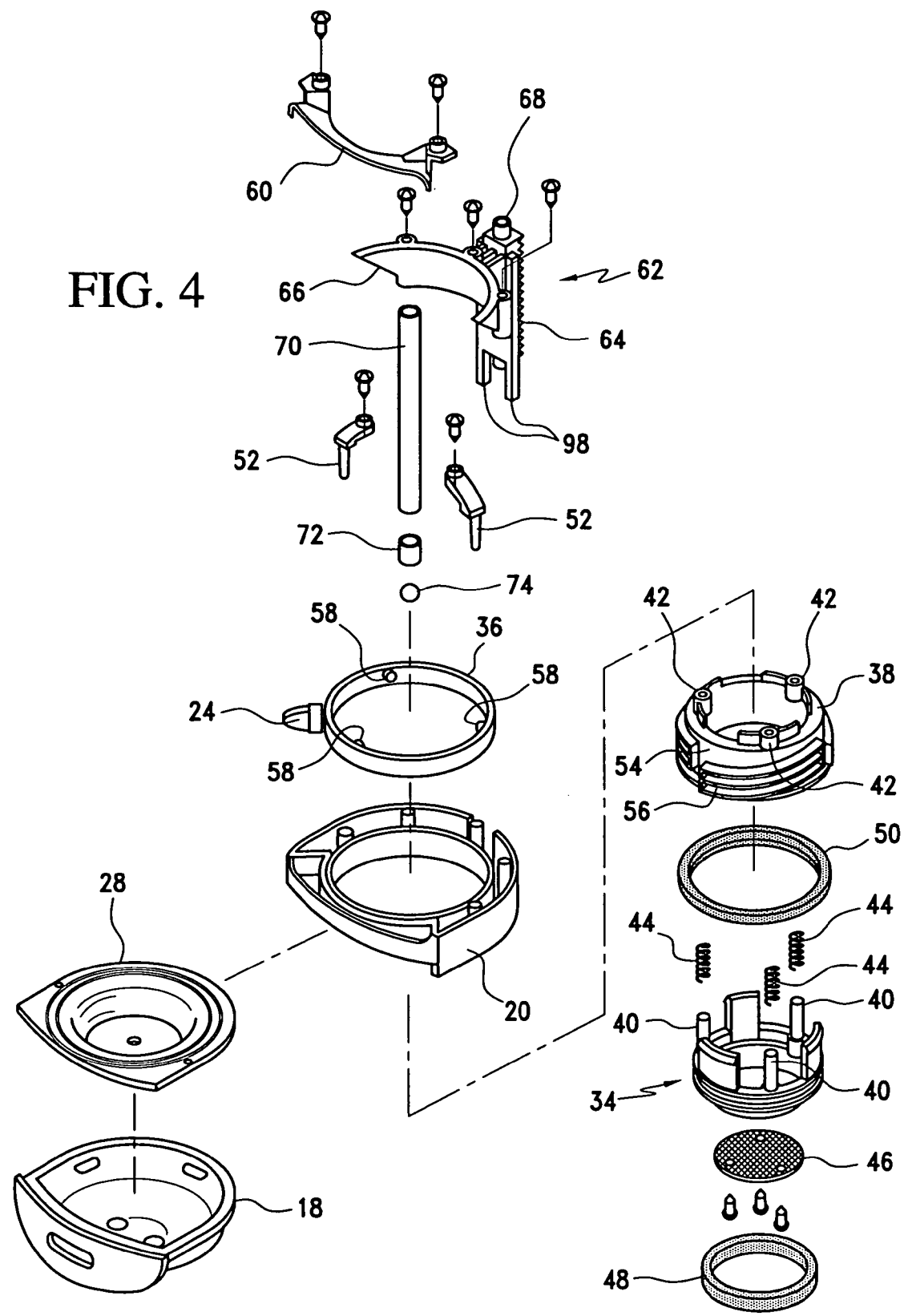
FIG. 4 is an assembly drawing of the showerhead assembly and pod holder drawer of FIG. 3.

Referring to FIGS. 3 and 4, the brew head 8 includes a showerhead 34 and a locking ring 36. The showerhead 34 is disposed in a vertically sliding manner within a holder 38. Vertical pins 40 are received within vertical holes 42 in a vertically sliding manner and biased downwardly by springs 44 disposed around respective vertical pins 40. The vertical adjustability of the showerhead 34 with respect to the holder 38 advantageously allows the pod holder 28 to accommodate one or more pods, as will be explained below. A sieve 46 is secured to the bottom of the showerhead 34. A seal 48 seals the showerhead 34 with respect to the inside wall of the holder 38. A seal 50 seals the showerhead 34 with respect to the pod holder 28. The seal 50 includes inwardly curled sealing lip 51 (see FIG. 8) that advantageously presses against an upper surface of the pod holder 28.

Vertical pins 52 are secured to the holder 38 and are used to lock the drawer 18 and the pod holder 28 in place when the locking ring 36 is turned to the right. The holder 38 has an outer cylindrical surface 54 which is provided with cam tracks 56 that engage respective inwardly directed pins 58 carried by the locking ring 36. An upper guide 60 is secured to the lower housing 20 and provides a guide for the locking ring 36.

A support structure 62 includes a rack 64 and a U-shaped member 66 secured to the lower housing 20. The rack 64 includes a longitudinal passageway 68 which is used to carry water part of the way from the reservoir 12 to the showerhead 34. A hose 70 connects the conduit 68 to the showerhead via a one-way valve comprising a valve seat 72 and valve ball 74.

Figure 5:
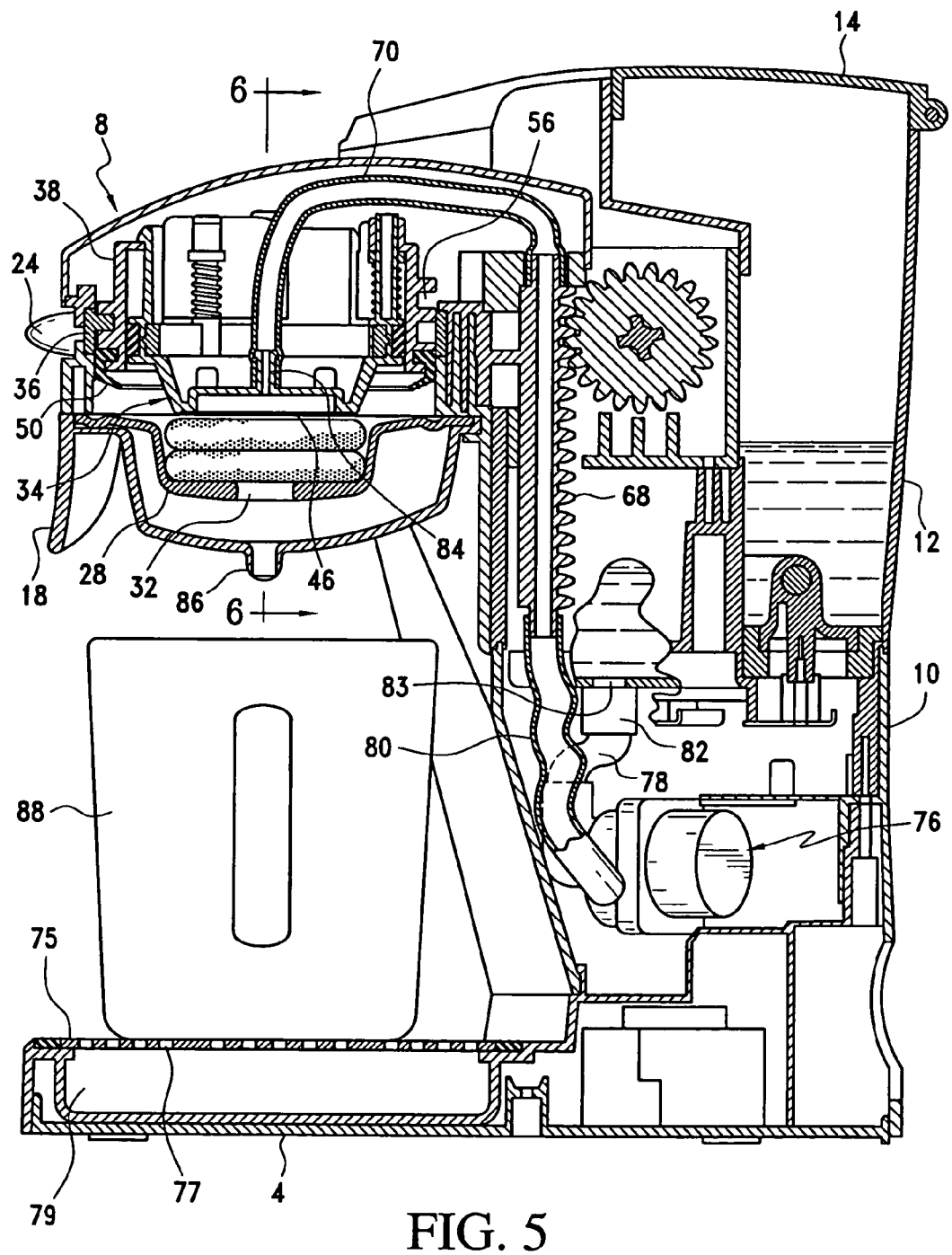
FIG. 5 is a cross-sectional view taken along line 5-5 of FIG. 1, showing the brew head in an open position.

Referring to FIG. 5, a pump 76 is disposed in the lower housing 10. The inlet side of the pump is connected to the reservoir 12 with a hose 78. The outlet side of the pump is connected to the rack passageway 68 with another hose 80. The hose 78 may be connected to a thermostatic valve 82 to open or close an opening 83 in the bottom of the reservoir 12. Preferably, the thermostatic valve is made from bi-metallic material which is sensitive to the water temperature. If the water is below 60° C., the valve will close off the opening 83. If the water temperature is above 60° C., it will open the opening. This is advantageous for single-serve units because it will eliminate the delivery of a cold cup of beverage at first use.

The hose 70 is shown connected to the passageway 68 and an inlet 84 on the showerhead 34. The drawer 18 includes outlet openings 86 through which the brewed beverage flows out to a cup 88.

The brew head holder 8 is shown in an open position in FIG. 5, wherein the seal 50 is disengaged from the periphery of the pod holder 28 and the pins 52 are disengaged from the holes 30. This allows the pod drawer 18 to be drawn out for cleaning or placement of the pods in the pod holder 28 for brewing.

Referring to FIGS. 6 and 7, the vertical pins 52 are shown retracted from their respective holes 30. At the same time, the locking ring pins 58 are disposed in the beginning and lower ends of the respective cam tracks 56.

Figure 8:
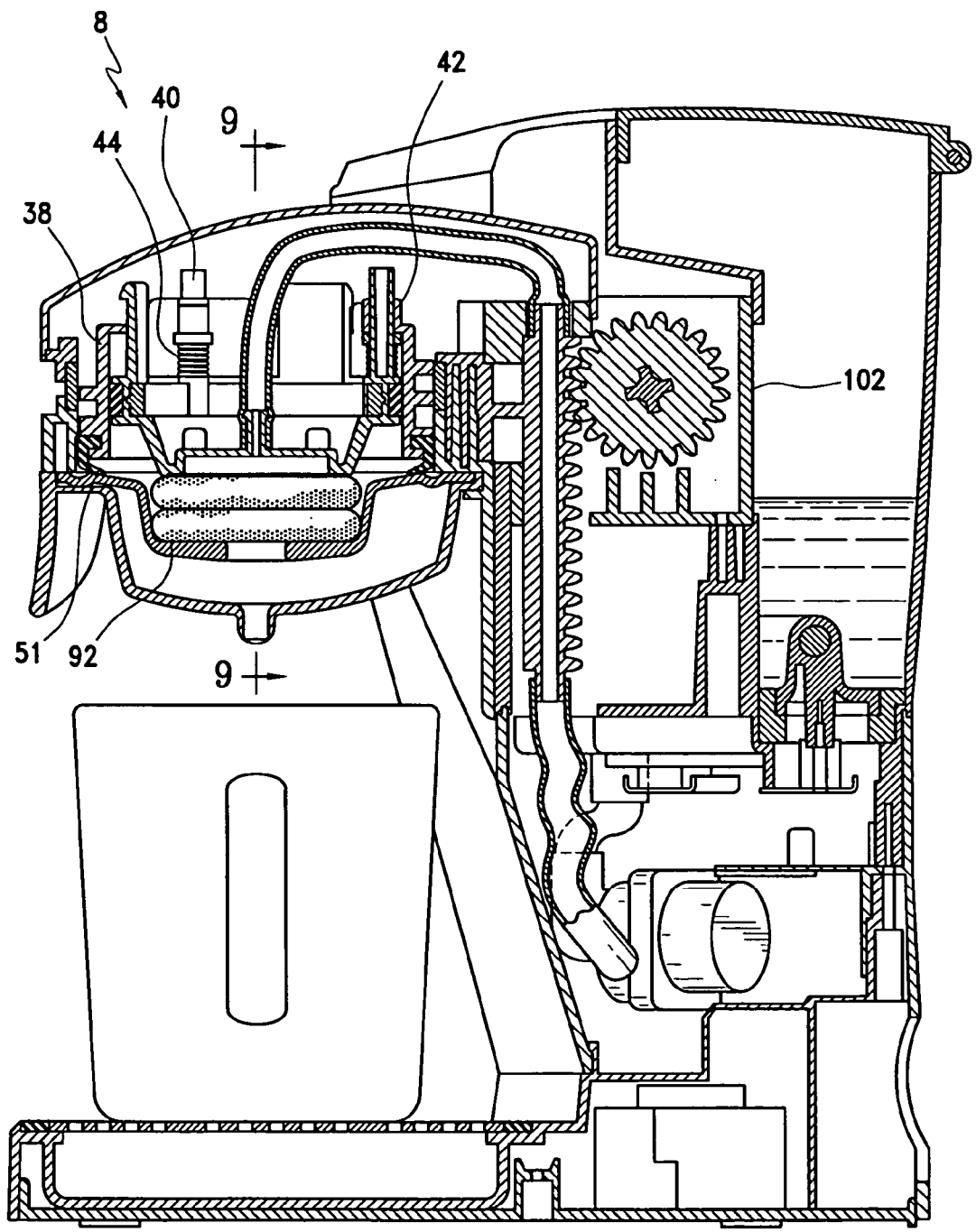
FIG. 8 is a view similar to FIG. 5, showing the brew head in a closed position.
Figure 9:
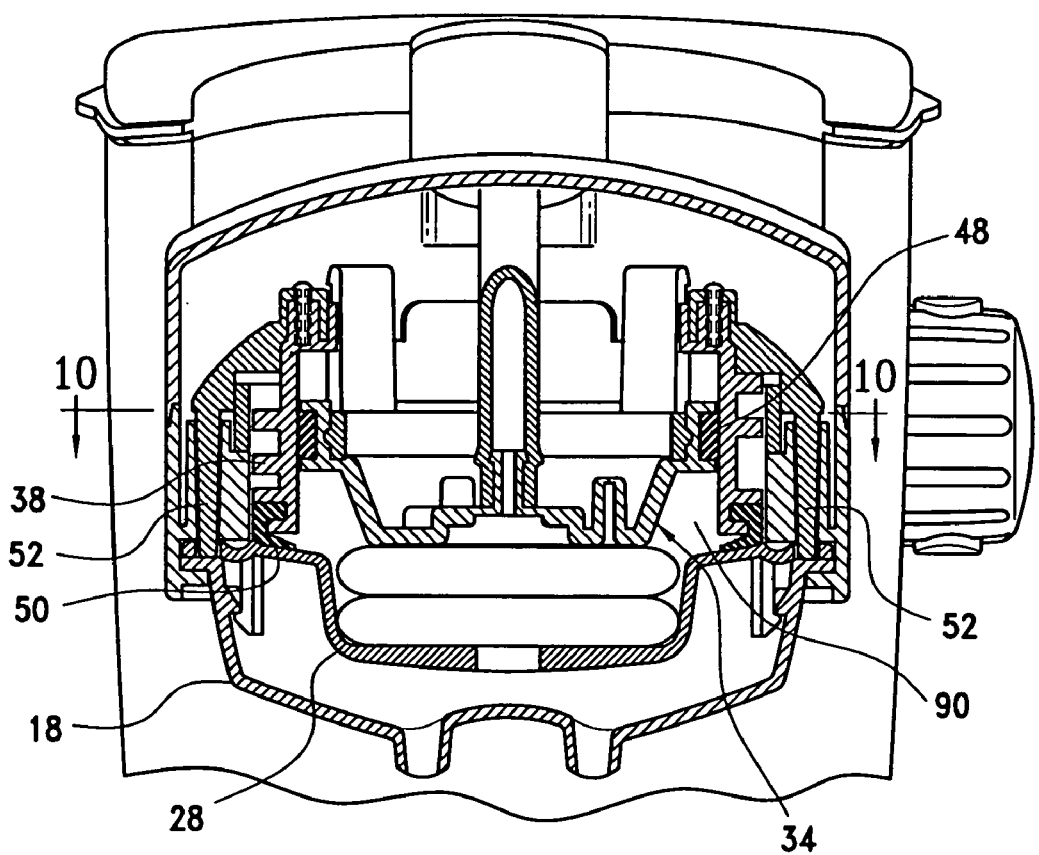
FIG. 9 is a cross-sectional view taken along line 9-9 of FIG. 8.
Figure 10:
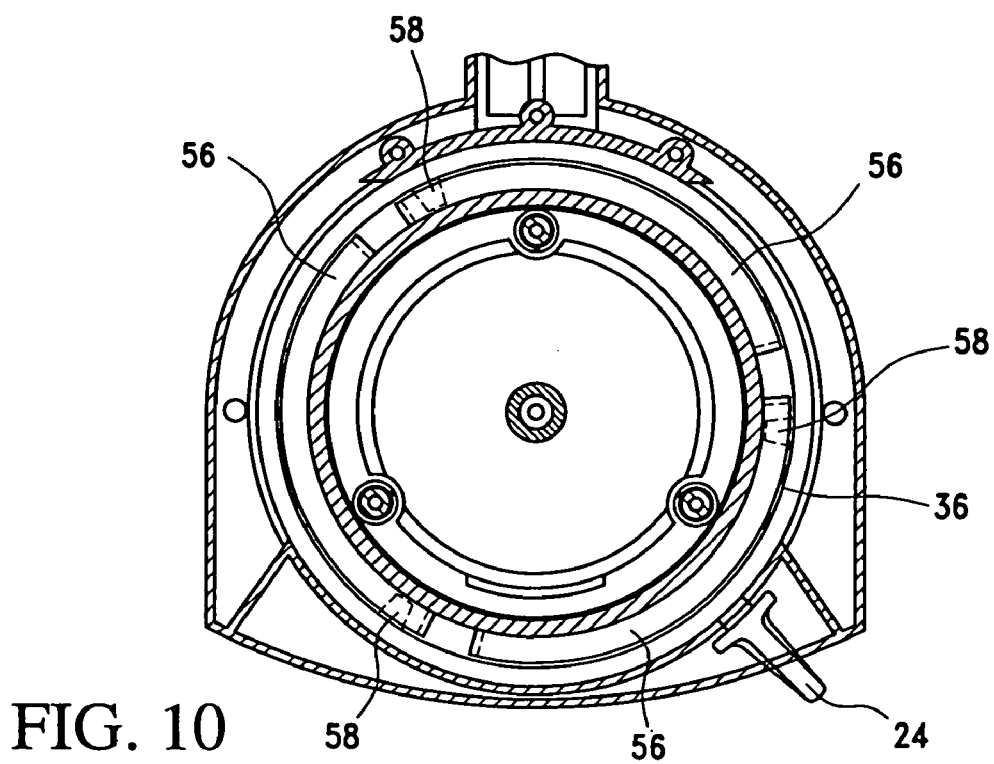
FIG. 10 is a cross-sectional view taken along line 10-10 of FIG. 9.

Referring to FIGS. 8, 9 and 10, showing the brew head 8 in a closed position, the tab 24 is pulled to the right, causing the locking ring pins 58 to ride up along the respective cam tracks 56 which then causes the showerhead holder 38 to move vertically downwardly with respect to the showerhead 34, which then allows the vertical pins 52 to engage the respective holes 30, thereby locking the drawer 18 and the pod holder 28 in place. In the closed position, the pod holder 28 and the showerhead 34 form a sealed chamber 90, with the seal 50 sealing the pod holder 28 with respect to the showerhead holder 38, and the seal 48 sealing the showerhead 34 with respect to the showerhead holder 38. Pressure within the chamber 90 advantageously helps in pressing down on the inwardly curled lips 51 against the top surface of the pod holder 28 to ensure a good seal. The chamber 90 is vertically adjustable by means of the springs 44 biasing the showerhead 34 downwardly and the pins 40 being slidably received within respective holes 42. In this manner, the chamber 90 can accommodate one or more pods 92.

Figure 11:
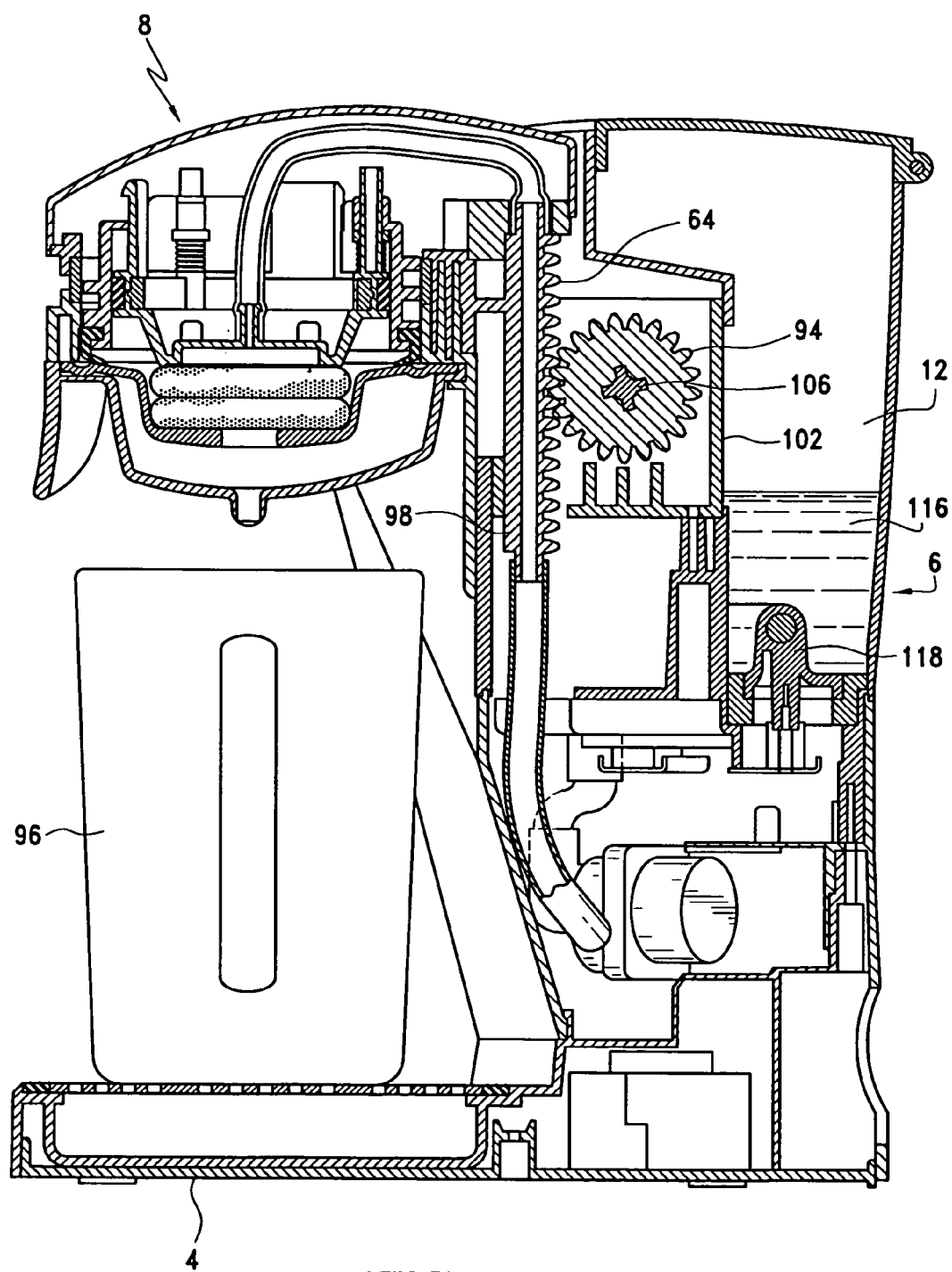
FIG. 11 is a cross-sectional view similar to FIG. 5, showing the brew head vertically raised to accommodate a taller cup.

Referring to FIG. 11, the rack 64 is engaged by a pinion gear 94 rotatably supported by the stand 6. Rotating the gear 94 by means of the knob 26 allows the user to adjust the height of the brew head 8 with respect to the base 4 to advantageously accommodate a smaller cup 88 or larger cup 96. The support structure 62 includes vertical guides 98 (see FIG. 4) received in corresponding pair of guide grooves 100 formed on a gear housing 102 fixed to the stand 6, as shown in FIG. 12.

A shaft 106 is operably secured to the gear 94. Referring to FIGS. 14 and 15, the shaft 106 is secured to the knob 26. Spring biased buttons 108 that include axial ribs 110 are received in corresponding axial grooves 112 of a lock ring 114. By depressing the buttons 108, the ribs are released from their corresponding grooves 112, thereby allowing the knob 26 to be turned clockwise or counterclockwise to raise or lower the brew head 8, respectively. Releasing the buttons 108 advantageously locks the gear 94, thereby maintaining the height adjustment just made to the brew head 8.

Referring back to FIG. 11, water 116 in the reservoir 12 is heated to the desired temperature by a heating element 118 controlled by a sensor 120, such as a thermistor that senses the water temperature and the temperature of the heating element 118. The thermistor 120 is disposed adjacent to the heating element 118 to enable it to sense heating element temperature and water temperature. A controller 124 receives signals from the thermistor 120 corresponding to the temperature of the water in the reservoir. The heating element 118 is protected by a thermostat 123 and a thermal cut-off device 125. The thermostat 123 is in contact with the heating element and is designed to cut off the power to the heating element in case of overheating. The controller 124 is provided power through AC lines 126 and controlled by the switch 16. An LED indicator light 128 provides indication when the power is on.

The controller 124 includes a look-up table which correlates the time it takes to raise a given amount of water in the reservoir to a pre-determined brewing temperature with the time the pump is activated to completely pump all the hot water in the reservoir and into a single-serve container such as the coffee cup 96. By counting the time from when the power is turned on to the time the thermistor reaches a desired pre-set temperature, $T_{hot}$, as for example 83° C. for brewing coffee, the controller 124 looks up the value of pumping time associated with that heating time and turns the pump on for a pre-set period of time plus a standard deviation that is calculated to be, for example, 5-8 seconds. The pump running time will be a function of and controlled by the water heating time, and not by the amount of water measured. The use of a look-up table advantageously eliminates the need to use a flow meter. It also advantageously eliminates the need to measure the amount of water that can be used by the user. All the water that is added to the reservoir is pumped to the cup. Accordingly, the user can use any amount of water that can be accommodated by the reservoir and be assured that the reservoir will be fully emptied when it has reached the temperature that the unit is designed for.

An example of a look-up table, establishing the pump run time based on the time it took to heat different amounts of water from an initial temperature of 25° C. to a brewing temperature $T_{hot}$ of, for example, 83° C., is shown below:

| Volume | IF $T_i$ | and IF $t_r$ | THEN Pump Run Time |
|---|---|---|---|
| 150 mL | 25° C. | 50 secs | 20 secs |
| 180 mL | 25° C. | 73 secs | 35 secs |
| 210 mL | 25° C. | 85 secs | 48 secs |
| 270 mL | 25° C. | 105 secs | 57 secs |
| 420 mL | 25° C. | 140 secs | 75 secs | where $T_i$ is the initial water temperature in the reservoir, $t_r$ is the time it took to heat the water in the reservoir to a desired temperature, for example 83° C., and pump run time is the time required to pump out the amount of water in the reservoir. These figures will change depending on the heater size and shape, reservoir size and shape, pump rate, and the initial water temperature.

An alternative way of operating the beverage maker without using a look-up table is also disclosed. The thermistor 120 is calibrated to established $T_{dry}$ and $T_{hot}$. As an example, $T_{dry}$ corresponds with the heater surface for dry start (empty reservoir), for example 72° C. and $T_{hot}$ corresponds to the desired water temperature for brewing, for example 96° C. at a distance of 0.25" from the heater surface in the center of the reservoir.

Figure 17:
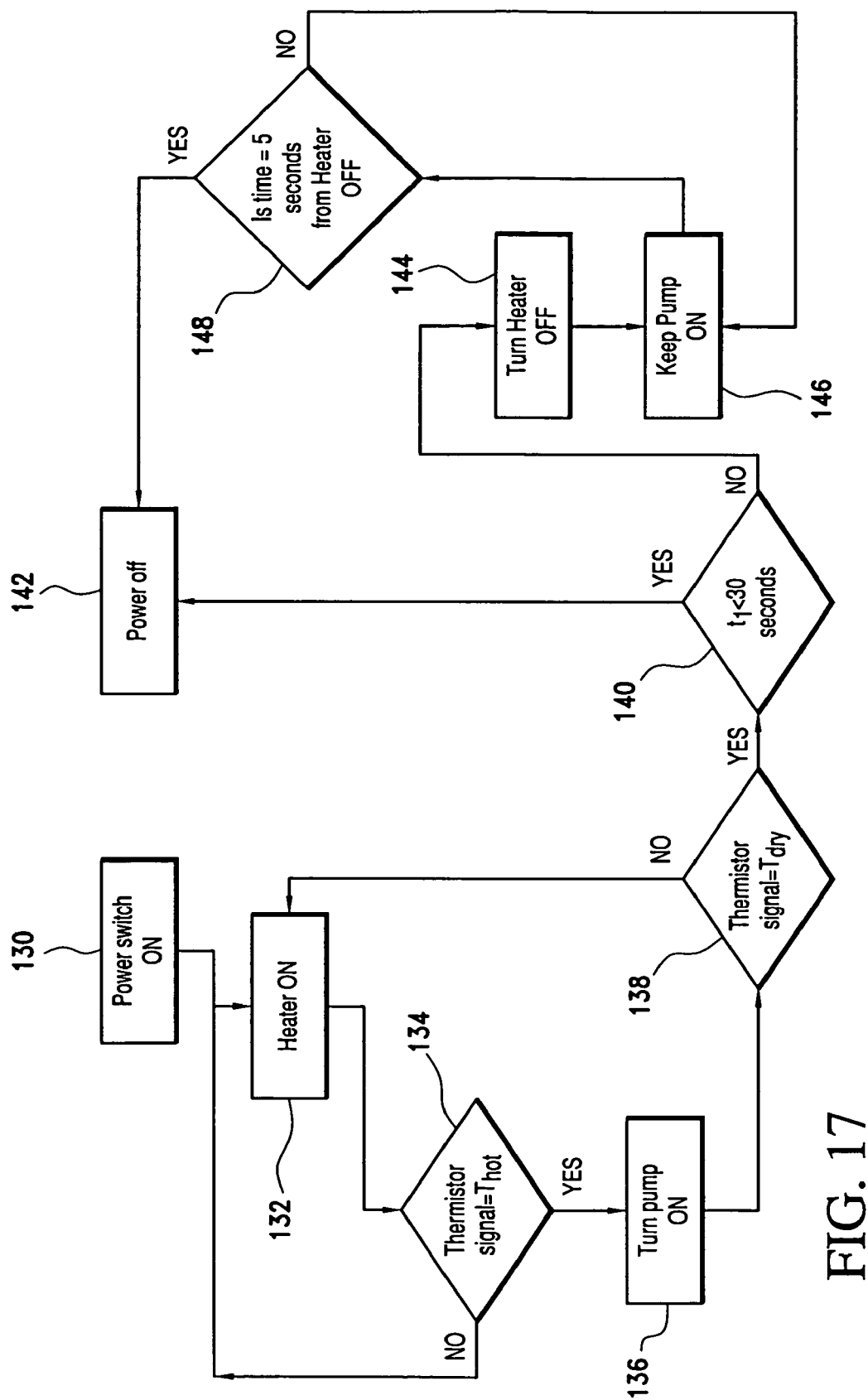
FIG. 17 is a flow chart used by the controller for controlling the operation of the beverage maker.

Referring to FIG. 17, the controller 124 operates the beverage maker 2 as follows. The power switch 16 is turned on at step 130 by the user. The heater comes on at 132. When the thermistor signal corresponds to $T_{hot}$ at 134, the pump is turned on at 136. When the thermistor signal says $T_{dry}$ at 138 and the time since turning the heater on is less than 30 seconds at 140, the power is turned off at 142; otherwise, the heater is turned off at 144 and the pump is kept on at 146. If the time since the heater is turned off is less than 5 seconds at 148, the pump is kept on; otherwise, the power is turned off at 142. The 30 secs time is used only as an example for convenience of illustration. It is meant to be a time period much less than the response time of the thermostat or thermal cut-off device so that overheating of the heating element is avoided, when damage to the beverage maker could result.

Figure 18:
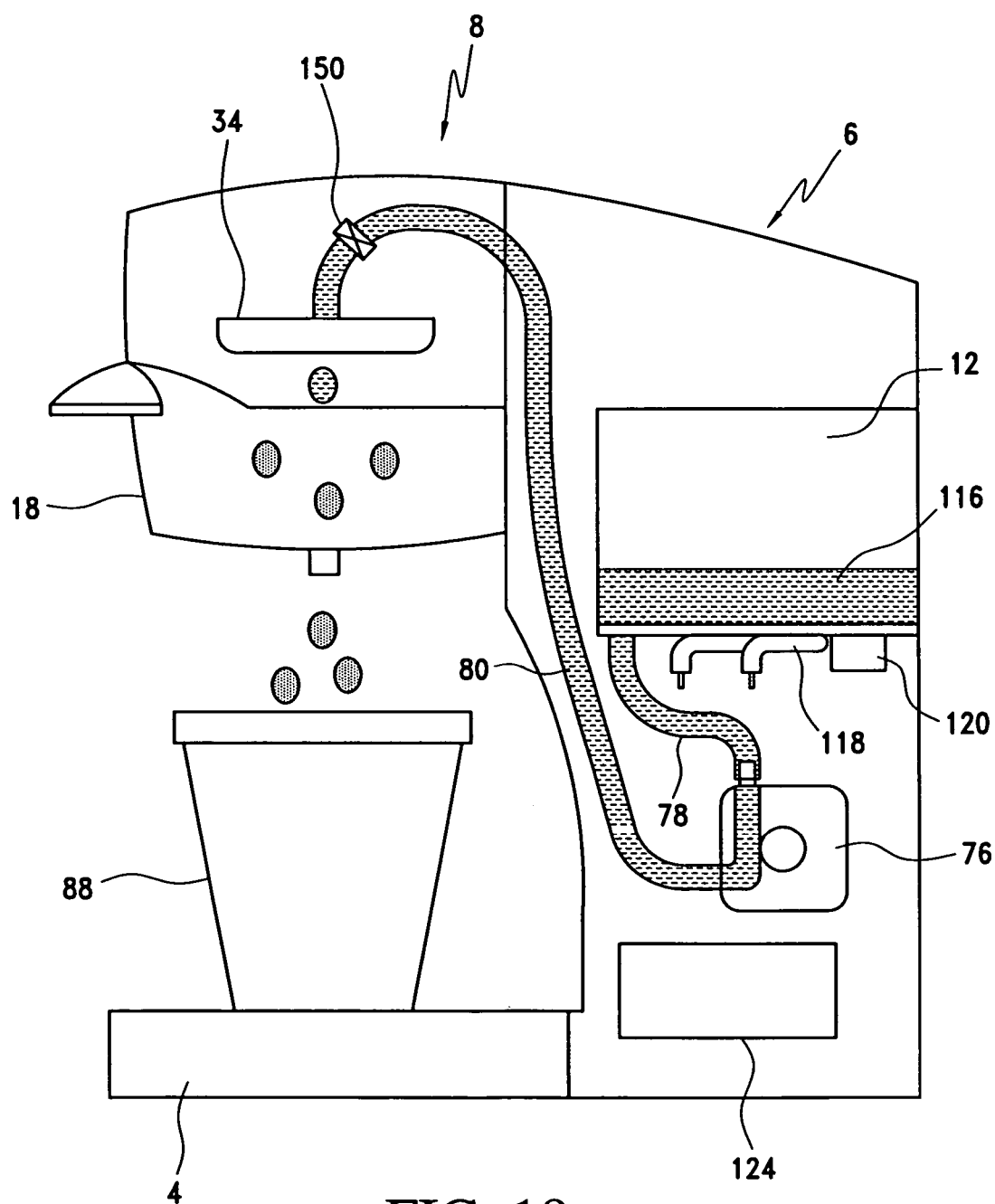
FIG. 18 is a schematic diagram of the present invention.

Referring to FIG. 18, a schematic diagram of the beverage maker 2 is shown. Water 116 in the reservoir 12 is heated by the heating element 118. The thermistor 120 sends temperature signals to the controller 124. When water temperature reaches the desired temperature, the pump is activated for specific amount of time based on the look-up table designed to empty the reservoir of all the water into the showerhead 34, through the pods in the drawer 18 and into the user's cup 88 or 96. Alternatively, without using the look-up table, the pump is run until after a few seconds, for example 5 secs, after temperature $T_{dry}$ is reached and the heating element has been turned off.

Referring back to FIG. 5, the base 4 includes a top wall 75 with a plurality of openings 77 that drain into a collection chamber 79 for collecting drippings from brew head.

A pod 92 is a pouch or packaging containing coffee, tea or other type of food for brewing. It should be understood that the pouch may be made of filter material or similar material that allows the hot water to flow through while keeping the contents within the pouch. It should also be understood that the pod is not limited to a pre-manufactured form. The pod may be made by the user using upper and lower filter membranes to capture the coffee grounds or tea leaves. The upper and lower filter membranes are then clamped between the top surface of the pod holder 28 and the curled lip 51 of the seal 50.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A beverage maker, comprising:
   a reservoir;
   a heater for heating water in said reservoir during a water heating time from a starting water temperature to a brewing water temperature;
   a temperature sensor for sensing the temperature of the water;
   a pump connected to said reservoir for pumping hot water from said reservoir at said brewing temperature to a user's cup via an infusible food material; and
   a controller coupled to said temperature sensor and to said pump, said controller comprising a plurality of water heating times and pump run times to operate said pump over predetermined pumping times based at least in part on the water heating time to bring the water temperature in said reservoir from said starting water temperature to said brewing water temperature.

2. A beverage maker as in claim 1, wherein said temperature sensor is a thermistor.

3. A beverage maker as in claim 1, wherein said controller includes a look-up table for said predetermined pumping times and said water heating times.

4. A beverage maker as in claim 1, wherein:
   said reservoir includes an opening on its bottom surface that communicates with said pump; and
   a thermostatic valve operably associated with said opening to open said opening at a certain temperature.

5. A beverage maker as in claim 4, wherein said thermostatic valve is made from a bi-metallic material.

6. A beverage maker, comprising:
   a reservoir;
   a heater for heating water in said reservoir during a water heating time from a starting water temperature to a brewing water temperature;
   a temperature sensor for sensing the temperature of the water in the reservoir and sensing the temperature about said heater;
   a pump operating in response to said temperature sensor, said pump connected to said reservoir for pumping hot water from said reservoir to a user's cup via an infusible food material; and a controller receiving temperature signals from said temperature sensor and programmed to turn said pump on when the water temperature reaches said brewing temperature, turn said heater off when said temperature sensor senses a higher temperature higher than said brewing temperature and run the pump after the heater has been turned off.

7. A beverage maker as in claim 6, wherein said controller is adapted to turn power off to said beverage maker when said temperature sensor senses said higher temperature and the time since turning the power on is less than a predetermined time period.

8. A beverage maker as in claim 7, wherein said controller is adapted to turn power off to said heater when said temperature sensor senses said higher temperature and the time since turning the power on is greater than said predetermined time period, and turn said pump off after a second predetermined time period.

9. A beverage maker as in claim 6, wherein:
said reservoir includes an opening on its bottom surface that communicates with said pump; and
a thermostatic valve operably associated with opening to open said opening at a certain temperature.

10. A beverage maker as in claim 9, wherein said thermostatic valve is made from a bi-metallic material.

* * * * *